Feb. 27, 1951 P. WOOG 2,543,653
LIQUEFIED FUEL TANK SAFETY MEANS
Filed June 10, 1946
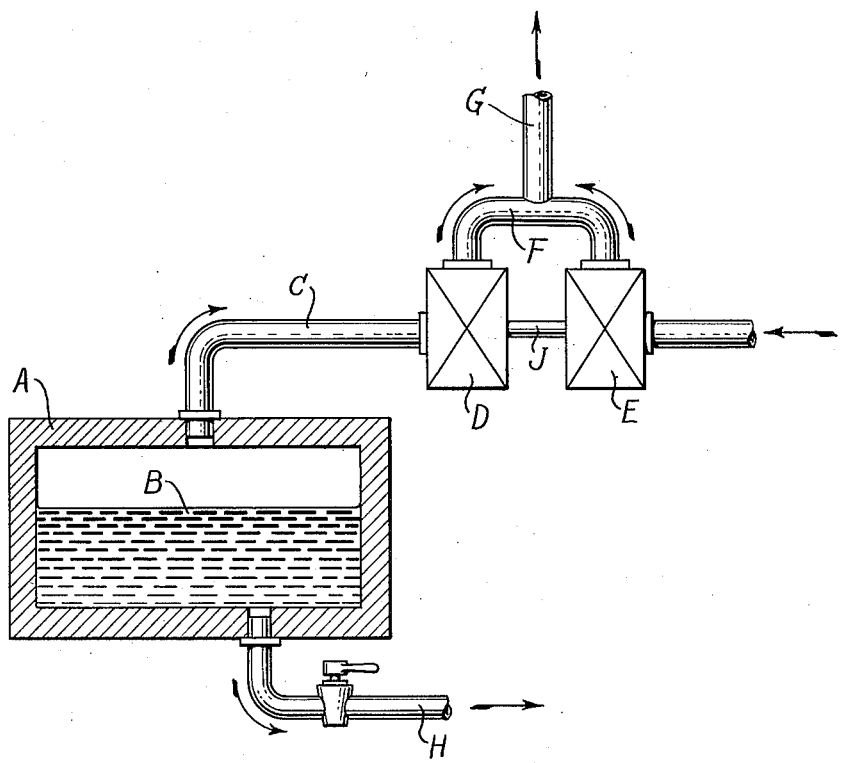
INVENTOR
Paul Woog
BY
Curtis, Morris + Sanford
ATTORNEYS

UNITED STATES PATENT OFFICE 2,543,653

LIQUEFIED FUEL TANK SAFETY MEANS

Paul Woog, Paris, France, assignor to Compagnie Francaise de Raffinage (Societe Anonyme), Paris, France Application June 10, 1946, Serial No. 675,816
In France May 18, 1942

Section 1, Public Law 690, August 8, 1946
Patent expires May 18, 1962

1 Claim. (Cl. 62—1)

It has been proposed in order to use various combustible gases in engines, without compressing said gases in heavy reservoirs, to liquefy the gases and then store the liquids in heat-insulated tanks; the liquefied gases, which are cooled by their actual preparation or by their evaporation are preserved in conditions which are substantially satisfactory; they are drawn from the tanks for use as required.

These methods involve a serious difficulty, viz. the evaporation of the liquefied gases, which occurs during the storage or while the tanks are being transported, owing to the supply of heat which, although more or less quick, is however inevitable. This therefore results in an escape of gas, a kind of leakage and, owing to the combustible nature of the gases, there is a risk of their igniting at some hot point or of causing explosions.

The present invention relates to a method and to devices for carrying it out which eliminate this drawback and provide complete safety.

The invention, which is illustrated in the accompanying drawing, essentially consists in fluid-tightly closing the heat-insulated tank A in which is located the liquefied gas B. Said gas is drawn off, in any suitable manner, in the liquid state, at H, and used, after evaporation, as a fuel in the engine. An exhaust pipe C conveys the gases which are evolved above the liquid to a device DE through which they pass and which measures them and compulsorily mixes them with a quantity of air, or optionally with another gas, which is sufficient for the lower limit of inflammability not to be exceeded. For example, it is known that the concentration of methane at the lower limit of inflammability of methane-air mixtures is about 5%, and hence if the tank A contains liquid methane the vapors withdrawn therefrom should be mixed with at least 20 times their volume of air. It is only after this intimate mixing, which makes the gases harmless, that it is possible for the mixture (gas+air) to escape outside.

The invention furthermore comprises various devices for enabling this method to be carried out:

A kind of double gas meter is used, one stage D of which receives the gases issuing from the tank A. The compartment drum of this meter is secured to the compartment drum of a second meter E which sucks in and measures the air to be added to the gas. The first meter D acts as a motor by the effect of the slight pressure of the gas contained in the tank above the liquefied gas. The meter of the second stage E acts as a pump and, driven by D, sucks in the air and delivers it to the mixer F, which is provided with baffles (not shown) for completing the mixture and with safety devices (wire gauze, for instance) preventing any accidental flash-back. The mixture escapes at G into the atmosphere. The meters D and E may be the conventional and well-known liquid displacement meters of the rotating drum type such as are used for measuring domestic gas consumption. The rotatable drums of the meters D and E are interconnected by a shaft J in such manner that the drums turn at the same speed.

The dosing of the gases and of the air may be effected by the respective capacity of the two meters, if the drums of both meters rotate at the same speed; on the other hand, a suitable reduction of the speed of the spindles of the meters may also be used.

I claim:

Apparatus for safely disposing of the vent gases from a closed tank containing a liquefied combustible gas which comprises a first gas meter of the rotatable drum type, a conduit connecting the vapor space of said tank with the inlet of said first meter, a second gas meter of the rotatable drum type having an inlet communicating with atmosphere, a shaft interconnecting the drums of said first and second meters to cause said drums to rotate at the same speed and a second conduit interconnecting the discharges of said first and second meter to cause the gas from said first meter to mix with the air from said second meter, said second conduit having an outlet through which the gas-air mixture passes to atmosphere.

PAUL WOOG.

REFERENCES CITED

The following references are of record in the file of this patent:

UNITED STATES PATENTS

| Number | Name | Date |
|---|---|---|
| 2,248,308 | Rice | July 8, 1941 |